Figures 1, 2:
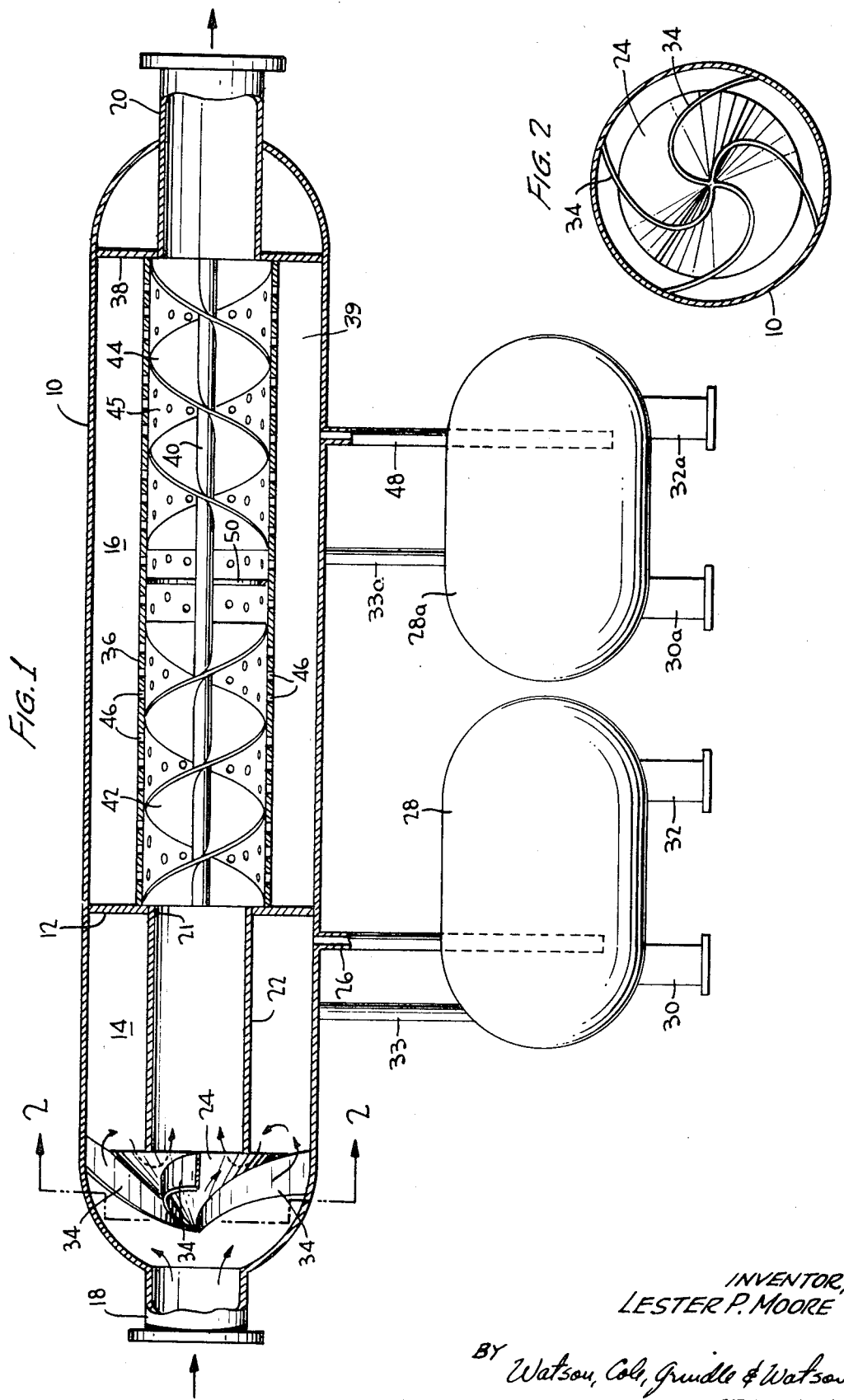

United States Patent

Moore

[15] 3,641,745
[45] Feb. 15, 1972

[54] GAS LIQUID SEPARATOR
[72] Inventor: Lester P. Moore, P.O. Box 1762, Corpus Christi, Tex. 18403
[22] Filed: Jan. 31, 1969
[21] Appl. No.: 795,531

[52] U.S. Cl..................................55/345, 55/457, 55/466
[51] Int. Cl.......................................................B01d 45/12
[58] Field of Search....................55/345, 347, 348, 449–451, 55/452, 456, 457, 466; 122/34, 488–491; 209/211, 144; 210/512

[56] References Cited

UNITED STATES PATENTS

| | | | |
|---|---|---|---|
| 612,207 | 10/1898 | Kincaid et al. | 55/457 |
| 1,420,954 | 6/1922 | Bickel et al. | 55/457 |
| 1,735,298 | 11/1929 | Pfeffer | 55/343 |
| 2,201,301 | 5/1940 | Richardson | 55/397 |
| 2,960,184 | 11/1960 | Deitlhauser | 55/456 |
| 2,425,588 | 8/1947 | Alexander | 55/398 |
| 2,659,451 | 11/1953 | Baird | 55/347 |
| 3,461,652 | 8/1969 | Sato | 55/457 |

FOREIGN PATENTS OR APPLICATIONS

| | | | |
|---|---|---|---|
| 42,323 | 2/1888 | Germany | 55/397 |
| 661,079 | 6/1938 | Germany | 55/457 |

*Primary Examiner*—Frank W. Lutter
*Assistant Examiner*—Bernard Nozick
*Attorney*—Watson, Cole, Grindle & Watson

[57] ABSTRACT

A gas liquid separator in which a conical deflector is interposed between relatively aligned and spaced conduit sections through which a flowing gas stream having liquid entrained therein moves. The conical deflector has its apex directed upstream to deflect the flowing stream of gas and liquid radially outwardly so that the gas may return radially inwardly after separation by inertia of the large masses of liquids to reenter the downstream conduit section for delivery to and through a spiral passageway surrounded by a multiperforated cylindrical shell whereby the velocity of the gas and its resulting swirling action centrifugally impel the remaining entrained smaller particles against the inner face of this cylindrical shell, the liquid then being free to escape through the perforations in the shell, while the flowing stream of gases is substantially confined therewithin.

4 Claims, 2 Drawing Figures

PATENTED FEB 15 1972

3,641,745

INVENTOR,
LESTER P. MOORE

BY Watson, Cole, Grindle & Watson
ATTORNEYS

GAS LIQUID SEPARATOR

This invention relates to improvements in a gas-liquid separator.

In the transmission of natural gas through pipelines the gas travels through the pipelines under pressures and at velocities varying from low to extremely high. Water or other liquids are frequently entrained in the gas streams. Not only is the liquid in the form of entrained droplets or particles, but frequently it is concentrated in large slugs amounting to several gallons. It is, of course, desirable to remove such entrained liquid with as little interruption as possible to the flow of the gas. However, the means for removing the entrained liquid from the flowing gas streams in conventional types of gas liquid separators has heretofore been subject to failure due to the velocity of the gas and entrained liquid exceeding the force of gravity which is applied in conventional separators to effect the desired separation.

Hence, in conventional separators, the device is so designed that its cross-sectional area of flow must be increased in area when a given volume is required at a reduced pressure, thus causing increased velocity. This increased velocity of the flowing stream would not allow gravity to separate the liquid particles from the stream by overcoming each liquid particle's kinetic energy in the stream unless at all times the cross-sectional area in the separator was great enough to reduce the velocity so that gravity would be effective.

Whereas, the Lester Moore Tandem Separator effects separation by utilizing the energy of the flowing stream to create centrifugal forces to separate the heavier liquid particles, and the desired separation can thus be accomplished with no increase in the cross-sectional area of flow. The Lester Moore device exhibits two major advantages over conventional separation equipment:

1. Maintains a smaller cross-sectional area of flow; this allows lower cost of separation equipment for any application.
2. Most important, in oilfield applications, a separator is subject to large changes in operating pressure, while the mass volume of gas through the separator remains relatively constant. As outlined in Bernoulli's Equation, a constant mass volume will result in low stream velocities at high pressure and high stream velocities at low pressures.

The Lester Moore Tandem Separator will separate under all loading combinations of pressure and velocities because the force used in separation is tapped from the flowing gas stream, and conventional separation, using only gravity, will fail when low pressure forces stream velocity higher, and hence, beyond the limits of gravity's separating force. The Lester Moore Tandem Separator applies more separating force at lower pressures, and hence higher velocities, thus overcoming the higher kinetic energy of entrained liquid particles under these low-pressure high-velocity conditions.

With these considerations in mind, the present invention contemplates the provision of a novel means for utilizing the velocity of the gas stream for removal of the large slugs of liquid by deflecting them as well as the gases radially outwardly from the line of flow of the gas stream and then permitting flow of the gases back into the line of flow while draining off the deflected liquid, the relatively greater mass and inertia of which will prevent its inward return to the line of flow, except as to the smaller entrained particles and droplets.

For thus deflecting the flowing stream form its line of flow, the invention contemplates, as one feature, the provision of the deflector in the form of a cone with its apex directed upstream in the line of flow.

In accordance with a further feature of the invention, the separating or liquid removing action of the deflector is further enhanced by providing it with spiral vanes concentric to the conical axis for initiating a whirling or swirling action of the stream to still further produce a separation of the gas and liquid by centrifugal action.

A still further feature of the invention consists in combining of the aforementioned deflector type separator with a separate centrifugal type separator through which the gases with any remaining drops or particles of liquid are passed, after removal of the larger slugs and particles by the first or deflector-type apparatus which, thus functions to prevent flooding of the second or centrifugal-type removal device.

The second or centrifugal-type removal device incorporates a novel structure in accordance with which the flowing stream has imparted thereto a rapid swirling action, and the gases are substantially confined within a cylindrical shell through which they flow, while the centrifugally extracted liquid is permitted to escape through suitable openings or perforations in the shell.

In the present application there is shown and described in detail the preferred embodiment only of the present invention, it being apparent that obvious variations will occur to persons of ordinary skill in the art, without departing from the inventive concept herein disclosed and claimed. In the accompanying drawings:

FIG. 1 is a view partly in side elevation and partly in section through the presently preferred form of the gas liquid separator of the present invention; and FIG. 2 is a section along the line 2—2 of FIG. 1.

Referring now in detail to the drawings, there is shown in FIG. 1 an elongated generally cylindrical casing or vessel 10 which is adapted for positioning in a pipeline in which natural gas or other gases are flowing and have entrained therein liquids which it is desired to separate from the gases. To thus adapt the casing 10 for interpositioning within the pipeline, the casing is formed at its opposite ends with inlet and outlet conduits 18 and 20, respectively, which are flanged or otherwise adapted in conventional manner to be coupled to the adjoining ends of the pipes or conduit sections forming the pipeline. In the arrangement shown, the inlet opening or conduit 18 is at the upstream end of the casing to receive and direct the inflowing stream of intermixed gas and liquid into the interior of the casing, while the outlet conduit 20 at the downstream end of the casing returns the gas into the relatively downstream section of the pipeline after removal of all or the major portion of the liquid from the stream. In the preferred embodiment the conduits 18 and 20 are relatively aligned with each other and with the cylindrical axis of the casing 10.

Within the hollow interior of the casing 10 is a transverse partition 12 which functions to divide the casing interior into first and second separating chambers 14 and 16, respectively, communicating with each other through a central opening 21 in the partition 12.

A further conduit 22, located in the chamber 14 communicates at its downstream end with the opening 21 and is secured to the partition around the opening. The upstream end of this further conduit 22 is spaced from the downstream end of the inlet conduit 18 and the conduits 18 and 22 are relatively aligned with each other.

Coaxially supported within the chamber 14 in the longitudinal space between the adjacent ends of the conduits 18 and 22 is a conical deflector 24, having its conical axis aligned with the cylindrical axes of said conduits 18 and 22 and its converging end directed upstream toward the inlet conduit 18 so that the inflowing gas and liquid mixture, upon impacting against the deflector 24 will be deflected radially outwardly in all directions from the coincidental axes of the cylindrical casing 10 and the conical deflector 24 so that the large slugs and/or the major portion of the entrained liquid will be directed onto the inner walls of the casing 10 to run down to the bottom of the casing and escape through a drain 26 into an enclosed liquid reservoir 28 supported beneath the casing 10 on suitable means such as the pedestals 30 and 32, respectively. It will be noted particularly that as to any large slugs of liquids entrained in the gas stream, substantially all of the liquid in such slugs will be diverted or deflected radially outwardly from the centerline of the casing 10 to the sidewalls thereof by the action of the conical deflector for substantially complete removal. Air displaced from the reservoir 28 by the liquids may escape through equalizer pipe 33 back into chamber 14.

In order to cause the inflowing stream of gas to rotate about the axis of the cylindrical casing 10 and thus in scrubbing engagement with its walls, the conical deflector 24 preferably is provided on its external conical face with spirally or helically inclined vanes 34. With such an arrangement many of the comparatively smaller droplets or particles of liquid entrained in the stream of gas, including such particles as may tend to splash back inwardly from the inner wall of the casing 10 are urged outwardly by centrifugal force toward the wall 10 to coat thereon and then to run by gravity to the bottom of the chamber 14 for discharge through the drain 26.

The conical deflector 24 is suitably supported just in advance of the upstream end of the conduit 22 and is preferably of substantially larger diameter than the conduit 22 to form on the downstream side of the deflector a comparatively dead space. The upstream end of the conduit 22 opens into this dead space at a location closely adjacent the deflector for reception of the gases together with any residual liquids still entrained in the gases following their engagement by the deflector 24.

In the preferred embodiment of the invention the deflector 24 is fixedly supported within the casing 10 as by means of extensions of the rigid vanes 34 which, preferably, are spirally inclined in conformity with the angular rotational flow of the swirling gases within the chamber 14. Preferably, the upstream end of the conduit 22 will terminate in or sufficiently close to the open downstream side of the hollow conical deflector 24, that in order to pass outwardly around the laterally outer edge of the deflector 24 and then back inwardly to the open upstream end of the conduit 22, the gases must reverse their flow direction, as indicated generally by the arrows in FIG. 1, such sudden reversal of direction causing a further separation by inertia of the relatively heavier liquid particles entrained in the gases.

The swirling gases together with any entrained residual particles of liquid then move through the conduit 22 and partition 12 into the chamber 16. The said stream is received within a cylindrical multiperforated conduit means or shell 36 which extends and establishes communication between the conduit 22 in chamber 14 and the outlet conduit 20. It will be noted that the conduit 22 serves as an inlet conduit to the shell 36 and that the shell 36 is spaced radially inwardly from the wall of the surrounding casing 10 and is supported at its opposite ends from the partition 12 and a suitable supporting annular web 38 encircling the upstream end of the outlet conduit 20.

Disposed in spiral or helical relation about a shaft 40, coaxially disposed within the shell 36 are helical means exemplified by one or more helically inclined vanes 42 and 44 respectively, for causing a rapid swirling or spiraling of the stream during its passage between he conduits 22 and 20, to remove smaller particles of entrained liquid from the flowing stream.

A swirling or spiraling motion concentric to the shaft 40 is imparted by the vanes to the gas stream, and the major portion of the swirling gases are confined within the cylindrical shell 36, whereby the chamber 16 externally of the shell 36 defines a relatively quiescent zone 39. At the same time, the swirling action of the gases and entrained liquids urges the liquid outwardly by centrifugal action against the inner face of the shell 36. The liquid is then free to pass outwardly through the multiple perforations 46 in the shell and thus into the chamber 16 externally of the shell to flow downwardly to the bottom of the chamber for passage through a drain 48 into the liquid receptacle 28a, having an equalizing pipe or airvent 33a similar to the pipe 33 earlier described.

It is desirable that the spiral vanes 34 of the deflector 24 and also the spiral vane 42 immediately downstream from the deflector 24 should have the same spiral inclination so that the vanes 34 will impart to the flowing stream a swirling motion in the same direction as the vane 42, whereby to enhance the swirling action and centrifugal separating function achieved by the combined actions of the vanes 34 and 42 and the shell 36.

It is desirable, though not essential from the broader aspects of the invention, that the downstream vane section or portion 44 be somewhat spaced axially from the spiral vane 42 and that its spiral inclination be opposite to that of the vane 42 and the vanes 34 of the conical deflector 24. There is thus produced a very substantial turbulence in the space between the vanes 42 and 44 incident to the reversal of its swirling or rotational direction by the flowing stream, and this is found to result in the depositing on the inner surface of the shell 36 of additional liquid particles which might otherwise remain entrained within the gas for its entire passage through the shell 36.

It is desirable in such an apparatus to minimize changes in velocity of the flowing stream through the conduit 22 and shell 36. To this end the internal diameters of the conduits or conduit sections 18, 20 and 22 will be identical, and the internal cross section of the flow passage 45 remaining within the cylindrical shell 36, after making due allowance for the space occupied by the spiral vanes 42, 44 and the shaft 40, will be substantially similar to that of the conduits 18, 20 and 22. For this same purpose it has been found desirable to provide in the space between the adjoining ends of the vanes 42 and 44 and annular member 50 defining an orifice equal in diameter to the interiors of the conduits 18, 20 and 22.

In the operation of the apparatus in accordance with my invention as above described, the flowing gas stream with entrained liquids enters the liquid collection chamber 14, within the casing 10 through the inlet conduit 18. The inflowing gas and liquid impacts against the conical deflector 24 and is deflected outwardly in all directions from the cylindrical axis of the casing 10 by virtue of the conical inclination of the deflector 24. In addition, during its outward movement, a rapid rotation or swirling movement is imparted to the stream by the action of the spiral vanes 34 on the upstream surface of the conical deflector 24. The liquid slugs and particles entrained within the stream of gas are thus deflected radially outwardly against the inner surface of the casing 10 in the chamber 14 to flow by gravity to the bottom of the chamber and escape through the drain 26 into the liquid receptacle 28. Because of the fact that the receptacle 28 is enclosed, there will be no outflow of gases through the drain 26. The major portion of the liquids are thus deflected from the intake end of the conduit 22 which is located in the comparatively quiescent space immediately downstream of the deflector 24, and if desired, the conduit 22 may project slightly into the hollow rear side of the conical deflector. Thus in order to enter the intake end of the conduit 22, the gas stream is required to make a sharp bend or reversal of its direction of flow, as indicated by the arrows in FIG. 1 and, in making such sharp bend, to further eliminate moisture particles which because of their relatively great mass and inertia will tend to continue in their movement toward the inner surface of casing 10 for eventual accumulation on the bottom of the chamber 14 and escape through the drain 26.

It will thus be apparent that the greater portion of the liquid entrained in the gas stream will have been removed therefrom before entry of the stream into the intake or inlet end of the inlet conduit 22 for the shell 36. Thus there will have been removed from such stream all of the larger slugs as well as the larger and heavier particles of liquid such as would tend to flood the perforated cylindrical shell 36 if permitted entry thereinto.

The gas stream, together with the residual smaller particles of entrained liquid, then flows through the conduit 22 and into the perforated shell 36. During its passage through the conduit 22 and at the time of its reception in the shell 36, the stream will have a swirling motion resulting from the action of the vanes 34 in the same direction in which the stream is caused to swirl incident to its entry into the shell 36 and its engagement with the spiral vane 42. The spiraling movement or rotation of the gas stream thus impels the entrained liquid particles and droplets outwardly against the inner wall of the shell 36 which shell tends to confine the swirling gases, while its multiple perforations 46 permit escape of the liquid to the surrounding portion of the chamber 16 for escape through the drain 48 into the liquid receptacle 28a. As the gas stream reaches the end of the first vane section 42, it passes axially through the space between the sections 42 and 44 and has a relatively reverse swirling or rotary action imparted to it by the vane section 44. The annular orifice defining member 50 defines a constriction through which the stream is caused to flow at an increased velocity. The annular members 50 and 38 in addition act as dams barring the flow toward the outlet conduit 20 of liquid on the inner surface of the cylindrical shell 36. The opposite spiral inclination of the vanes or vane sections 42 and 44 with respect to each other create a zone of turbulence in the gas stream during its transition from the vane 42 to the vane 44 and thus in turn promotes a separation of liquid particles which might otherwise pass completely through the apparatus.

The stream of gas following its treatment within the chambers 14 and 16 is then discharged through the outlet conduit 20 to continue its movement through the pipeline.

The apparatus of the invention will have removed the greater portion of the liquid from the gas stream with but a minimum reduction in the velocity of the stream. The entire energy for the separation process will have been derived from the flowing stream itself, and the apparatus itself may be quite simple in its structure and capable of economical production.

It will be readily apparent that for treating gases having varying velocities and quantities of entrained liquids, two or more of the separating units such as illustrated in FIG. 1 may be interconnected in series relation.

Having thus described my invention, I claim:

1. A separator for removal of liquid from a flowing stream of gas having particles of liquid entrained therein, comprising:
   a cylindrical shell having a smooth internal cylindrical surface of constant diameter throughout its length and end walls;
   inlet and outlet conduits of constant cross-sectional area communicating with and connected to the end walls of said shell for directing said flowing stream through said shell;
   a casing encompassing and spaced radially from said shell to define a quiescent zone therearound between said inlet and outlet conduits;
   helical means within and coaxial to said shell and substantially coextensive in length therewith to impart to said stream a swirling movement about the cylindrical axis of said shell whereby to throw said particles of liquid from the stream outwardly onto the internal cylindrical surface of said shell;
   said shell including means permitting escape of said liquid into said quiescent zone while substantially confining the swirling gas within the shell;
   means for draining the liquid from said quiescent zone;
   said inlet and outlet conduits having equal internal cross-sectional areas, said shell having a greater internal diameter than each of said conduits, but with said helical means defining a flow passage with said shell having a cross-sectional area equal to the internal cross-sectional areas of each of said conduits, whereby to minimize changes in velocity of the stream during its flow through the separator;
   there being an annular dam at the juncture of said shell with said outlet conduit and connecting same said dam having an internal diameter less than that of the shell and equal to that of the outlet conduit to bar the flow of liquid into said conduit, without forming a constriction of said flow path.

2. The separator as defined in claim 1 in which said helical means comprises a pair of axially aligned helical vanes having opposite helical inclinations to produce swirling action of the stream in opposite angular directions about the cylindrical axis of said shell.

3. A separator as defined in claim 2 including means interposed within the shell between said vanes for defining an orifice having a cross-sectional area equal to the internal cross-sectional areas of said respective inlet and outlet conduits.

4. A separator for removing entrained liquids from a moving gas stream comprising:
   a vessel having a liquid collecting chamber therein, an inlet conduit opening axially into the upstream end of said chamber and a liquid outlet opening into the liquid collecting chamber;
   a conical deflector in the chamber spaced from the vessel wall with its conical axis aligned with and adjacent the inlet conduit, the deflector converging toward the upstream end of the vessel and having vanes on the upstream surface thereof for swirling an inflowing stream of gas and entrained liquid outwardly toward the interior vessel wall and thereby centrifugally depositing liquid thereon;
   means for directing the flow of gas and entrained liquid from adjacent the vessel wall flowing in the downstream direction to adjacent the vessel center flowing in the downstream direction;
   axially aligned conduit means in fluid receiving relation with the flow directing means and extending out out the chamber;
   helical means within the coaxial to the conduit means for swirling the gas and entrained liquid and thereby centrifugally depositing liquid on the interior wall thereof;
   means for removing liquid from the interior wall of the conduit means into the vessel; and
   an outlet conduit in communication with said conduit means for discharging gas from the vessel, said flow directing means comprising means for reversing the flow of gas and entrained liquid from adjacent the vessel wall flowing in the downstream direction toward the vessel center flowing in the downstream direction toward the vessel center flowing in the upstream direction and ultimately in the vessel center flowing in the downstream direction.

* * * * *